United States Patent [19]

Baumann

[11] Patent Number: 4,628,470

[45] Date of Patent: Dec. 9, 1986

[54] APPARATUS AND METHOD FOR GENERATING A PICTORIAL DISPLAY ON A MEASURING INSTRUMENT DURING A METERING PROCESS

[75] Inventor: Arthur Baumann, Bertschikon, Switzerland

[73] Assignee: Mettler Instruments AG, Greifensee-Zurich, Switzerland

[21] Appl. No.: 569,175

[22] Filed: Jan. 9, 1984

[30] Foreign Application Priority Data

Jun. 10, 1983 [CH] Switzerland .................. 3197/83

[51] Int. Cl.$^4$ .................. G09F 9/32; G06F 15/20
[52] U.S. Cl. .................. 364/567; 340/723; 364/518
[58] Field of Search .............. 364/567, 570, 518, 521; 340/720, 723, 724, 731, 748

[56] References Cited

U.S. PATENT DOCUMENTS

| | | | |
|---|---|---|---|
| 4,008,405 | 2/1977 | Neumann et al. | 364/567 X |
| 4,107,665 | 8/1978 | Mayer et al. | 340/731 X |
| 4,200,896 | 4/1980 | Baumann | 364/570 |
| 4,247,843 | 1/1981 | Miller et al. | 340/724 X |

FOREIGN PATENT DOCUMENTS

| | | |
|---|---|---|
| 2536045 | 2/1977 | Fed. Rep. of Germany . |
| 2702842 | 12/1977 | Fed. Rep. of Germany . |
| 2604747 | 6/1979 | Fed. Rep. of Germany . |

Primary Examiner—Parshotam S. Lall
Assistant Examiner—H. R. Herndon
Attorney, Agent, or Firm—Erwin S. Teltscher

[57] ABSTRACT

To start a metering process, the operator enters the desired weight value into a display control. The display contains a container shaped figure which is "filled" as material is added to the balance. The rate at which the container fills relative to the rate at which the substance is being applied to the instrument changes during the metering process. It is slow during the coarse starting phase and more rapid during the final fine metering phase. The shape of the bottle preferably corresponds to the "fill" rate, i.e. it is relatively wide at the bottom and has a narrow neck at the top. The display is controlled by a microcomputer.

20 Claims, 4 Drawing Figures

APPARATUS AND METHOD FOR GENERATING A PICTORIAL DISPLAY ON A MEASURING INSTRUMENT DURING A METERING PROCESS

CROSS REFERENCE TO RELATED APPLICATIONS AND PUBLICATIONS

U.S. application Ser. No. 569,173, now U.S. Pat. No. 4,591,0011, filed simultaneously herewith, by the same inventor and assigned to the same assignee, and claiming the priority of a Swiss Application No. 3196/83-7.

U.S. Pat. No 4,200,896.

FIELD OF THE INVENTION

The present invention relates to measuring instruments, and more particularly, to balances in which one or more substances are metered to a desired value by an operator guided by the display.

BACKGROUND OF THE INVENTION

Methods and apparatus for aiding the operator in the metering process have previously been proposed. For example, German Published Application No 25 36 045 describes a balance which has a non-numeric display in addition to the conventional numeric display. The non-numeric display furnishes an indication of the still available weight range or, alternatively, of the weight range already used. German Pat. No. 26 04 747 describes a similar balance in which strips of light emitting elements arranged in the forms of symbols are used. However, none of the known balances are suitable as an aid to the operator during a metering process unless, coincidently, the desired weight is the same as the maximum value accommodated by the balance.

U.S. Pat. No. 4,200,896 discloses a seven segment display in which only the horizontal segments are activated when a non-numeric display is desired. In this display, the operator derives information as to the amount of the substance on the balance by the position of the horizontal segments. This method has the advantage that a separate additional display is not required. However it has the disadvantage that the display takes place in fixed decimal steps. In addition, it requires a higher concentration on the part of the operator because the metering process must be fitted to the logarithmic rate of change of the display. These remarks also apply to another known method (disclosed in German Published Application No. 27 02 842) which also operates in fixed decimal steps, but wherein a numeric display is used in addition to a non-numeric display utilizing light emitting elements.

SUMMARY OF THE INVENTION

It is an object of the present invention to furnish a method and apparatus for creating a display offering the operator improved unequivocal optical guidance during a metering process.

In accordance with the present invention, a picture, for example, a substantially uniformly defined outline of a container appears on the display. During a metering cycle, that is during the time that the substance on the measuring instrument or balance changes from a starting to a desired value, the rate of change at which the container is filled relative to the rate of change at which the substance is being applied to the balance (i.e. the image rate of change) changes at least once. Thus the display sensitivity changes at least once, the weight range near the desired value being expanded so that the operator can apply the substance rapidly during a coarse metering phase at the start of the metering cycle and then apply it more slowly as the desired value is being reached. In particular the image of a container which is filled as the substance is being applied is particularly comprehensible to personnel with a minimum of training and experience. In addition, a pictorial representation having two different sensitivities results in a substantial decrease in the time required for metering, without increasing the risk of overdosing.

A number of different embodiments is possible. For example, the relationship between the rate of change of weight on the scale and the image rate of change can vary continuously in accordance with a mathematical formula throughout the metering cycle. In a preferred embodiment, a first relationship exists between the metering rate and the image rate of change during the coarse metering phase, while a second relationship exists during the second, fine metering phase. A third phase may be provided between the first and second phase, the relationship between the metering rate and the image rate of change changing slowly from the first to the second relationship during such a third phase. This prevents a step-wise transition from a slower to a more rapid image rate of change and thus allows the operator a little time to accommodate the metering rate to the new image rate of change.

A scale may be furnished in the display in the region of the desired value. This again facilitates the metering operation and allows metering to a very close tolerance in the critical region. It is also advantageous to indicate on the scale the weight of the substance represented by each division.

It is critical to both the method and the apparatus of the present invention that the image rate of change relative to the metering rate changes at least once during a complete metering cycle.

The display unit of the present invention preferably includes a cathode ray screen. This allows a particularly elegant representation of the container and any additional signs, symbols etc.

Alternatively, fixed, selectively controllable display or indicator elements may be used. This embodiment is particularly viable for an economic manufacture of a large number of units.

The measuring instrument of the present invention can be made particularly adaptable to various different conditions, if a selector element is provided by which the percentage of the desired weight at which the image rate of change changes may be selected.

The novel features which are considered as characteristic of the invention are set forth in particular in the appended claims. The invention itself, however, both as to its construction and its method of operation, together with additional objects and advantages thereof, will best be understood from the following description of specific embodiments when read in conjunction with the accompanying drawing.

DESCRIPTION OF THE PREFERRED EMBODIMENTS

Figure 1:
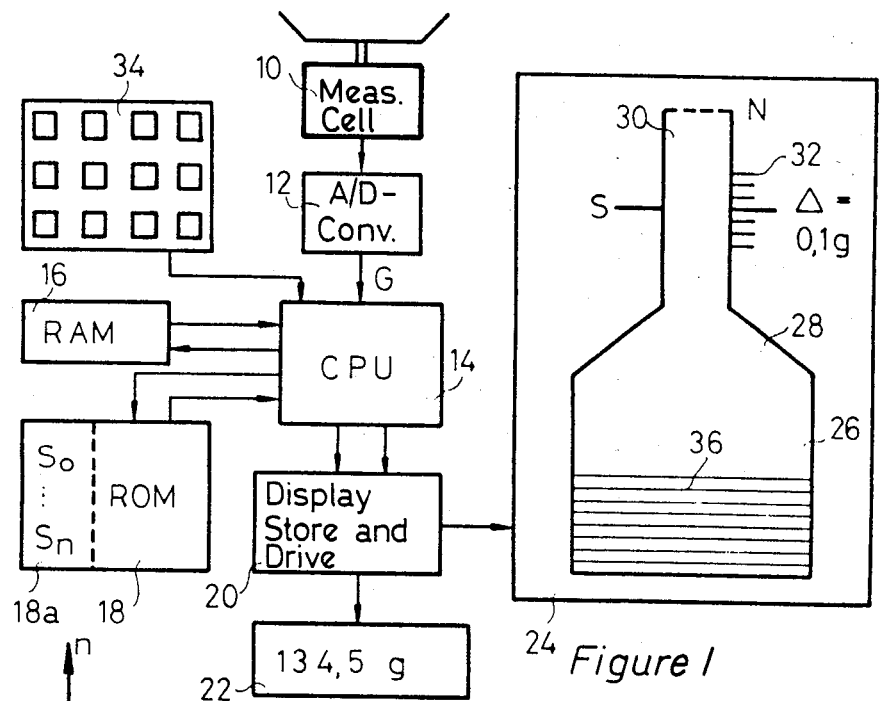
FIG. 1 is a schematic block diagram of a measuring instrument according to the present invention with enlarged display, the contour of which is shown in full lines.

Referring now to FIG. 1, a balance or measuring cell 10 furnishes an analog signal corresponding to the weight of the substance on the balance. This is converted to a digital signal (weight indicative signal G) in analog/digital converter 12. The signal G is processed in a microcomputer. The latter consists of a central processing unit (CPU) 14, a read/write storage (RAM) 16 and a read only memory (ROM) 18. A display storage and drive circuit 20 is connected to CPU 14 and drives a standard digital display 22 as well as a nonnumeric or analog display 24. The outline of a bottle-shaped container is pictured on the latter, the container having a lower wide portion 26, a transition zone 28 and a narrow neck 30. A horizontal line S in the center of the neck on both sides thereof indicates the desired value. Three further marks 32 are provided above and below marks S. The value of the distance between any two marks is also specified. In the example it is 0.1 grams.

A keyboard 34 for entering numeric values as well as control signals is also provided.

Figure 2:
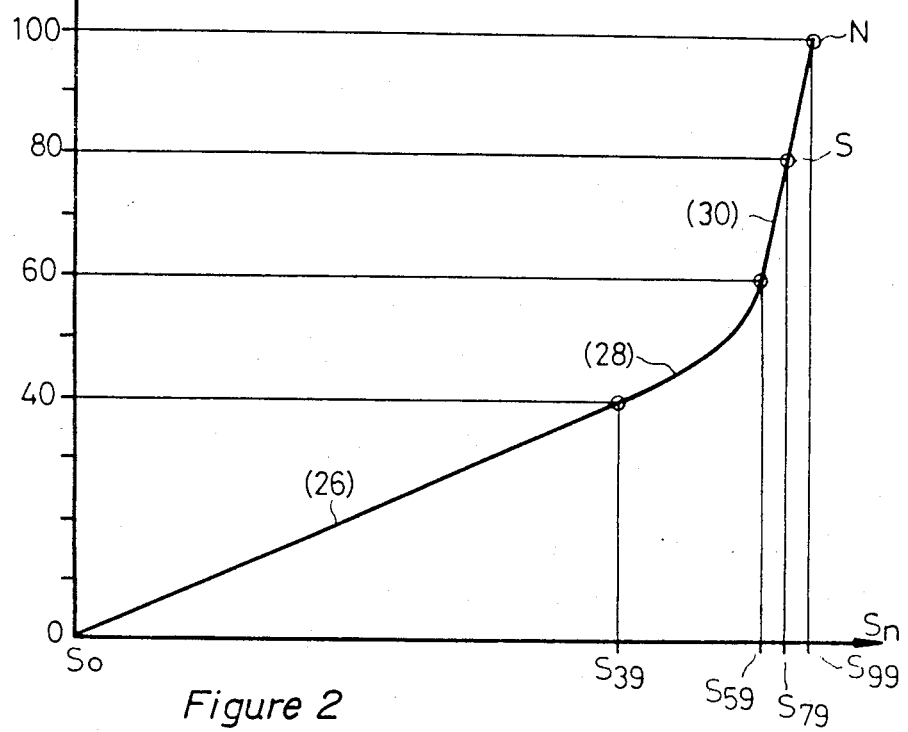
FIG. 2 is a plot illustrating the image rate of change during the metering process.

Before load is applied to the balance, or after reset to zero, or after taring, the number "000.0g" appears in the digital display, while only the outline of the container appears in analog display 24. As weight is added, horizontal lines 36 appear, starting at the bottom of the container and continuing towards the top. The container is "being filled". The lower, wider portion 26 is filled during the coarse metering phase at a relatively low speed relative to the rate of application of the substance to the balance. This is also indicated in FIG. 2. Approximately 80% of the desired weight has been applied to the balance when transition zone 28 of the container is reached. At this point, if the metering rate, that is the rate of application of the substance to the scale, remains the same, the speed at which the container is being filled increases. This increase is continuous until the transition zone 28 has been passed. At this point the second image rate of change relative to the metering rate has been reached. This may, for example, be between eight and ten times as high as the first image rate of change. In practice of course the rate of application of the substance to the balance decreases during the fine metering phase. The operator has enough time to effect such a decrease in transition zone 28.

The relationship between the metering rate and the image rate of change, i.e. between the increase in weight and the number of elements 36 to be activated, is shown graphically in FIG. 2. A first linear relationship exists during the coarse metering phase, (see branch 26 of FIG. 2). During the transition phase indicated by reference numeral 28 in FIG. 1, the relationship varies in accordance with curve 28 of FIG. 2. This is a non-linear relationship. Finally, a second linear relationship having a greater slope than the first linear relationship is present during the fine metering phase. This is marked by reference numeral 30 in FIG. 2 and corresponds to the filling of the neck in container 26 in FIG. 1. The display thus reacts with much higher sensitivity to changes in the weight being applied to the balance.

The letter N in FIGS. 1 and 2 signifies the end point of the analog display. If further weight is applied to the balance, no change in the display takes place. It should be noted that marks 32 can constitute an indication of allowable tolerances. In the present example the allowable tolerances would be plus or minus 0.3 grams relative to the desired value.

Figure 3:
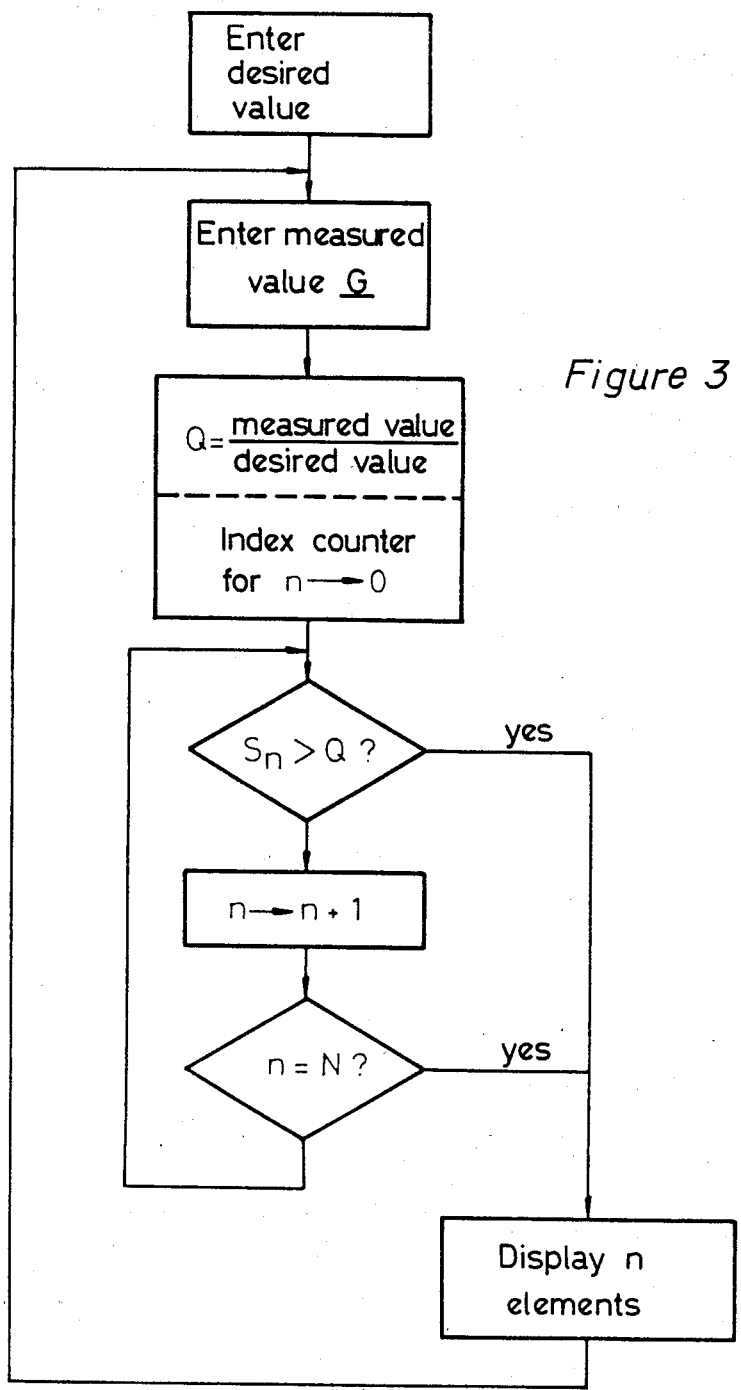
FIG. 3 is a flow chart for the microcomputer controlling the image.
Figure 4:
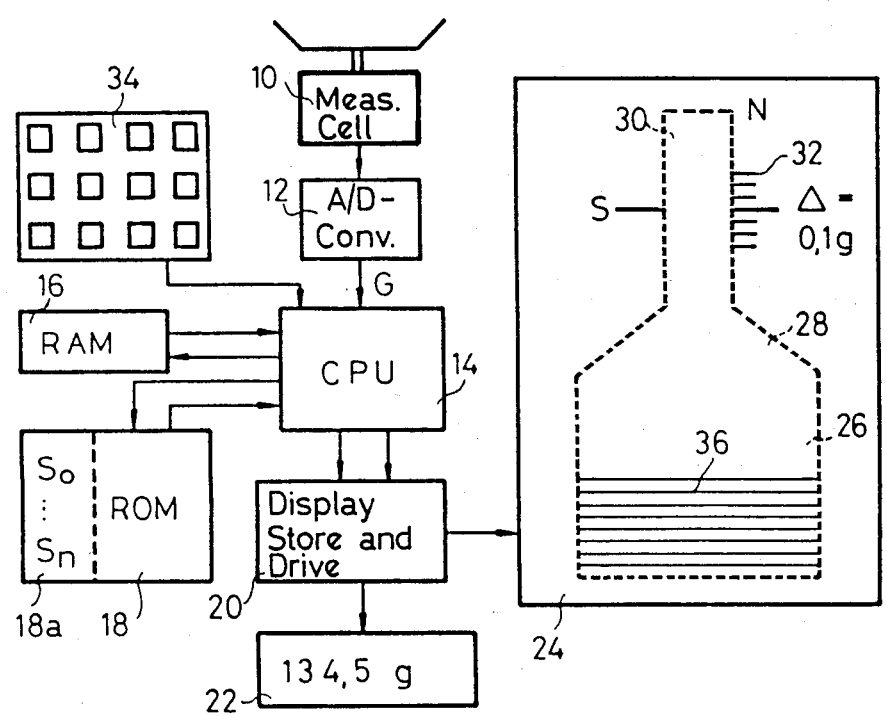
FIG. 4 corresponds to FIG. 1, but shows the contour of the container in dotted lines.

The meaning of the symbols $S_O \ldots S_{99}$, denoting the abscissa units in FIG. 2, as well as the small (from 0 to 100) for the ordinate will become clear in connection with the following description of a metering cycle in connection with the flow chart of FIG. 3.

The desired weight value is entered by means of keyboard 34 at the start of the metering cycle. This is stored in RAM 16. If necessary, it may be called out by activation of a key in keyboard 34 for display in digital display 22.

Storage part 18($a$) of RAM 18 contains a table having threshold values $S_n$ ($S_O \ldots S_{99}$). For each cycle clocked by the microcomputer, the following steps take place:

The value of the then present net weight G on the scale is entered;

an index counter for n is reset to zero;

the quotient of actual weight/desired weight is calculated and compared to the stored threshold value $S_n$. The index counter is advanced step by step until either the stored threshold value $S_n$ exceeds Q (before the n value N is reached) or the last threshold value (here: $S_{99}$) is equal to or less than the value corresponding to the end value N;

CPU 14 controls the display storage and drive circuit 20 so that the number of display elements 36 in analog display 24 is activated which corresponds to the then addressed storage value $S_n$. The actual net weight value is also displayed in digital display 22.

In the illustrative example, there are 100 horizontal line display elements 36, all equidistant from one another. Of these, forty are assigned to the coarse metering phase (corresponding to the threshold values $S_O \ldots S_{39}$). Twenty are assigned to the transition phase ($S_{40} \ldots S_{59}$) Twenty more are assigned to the fine metering phase up to the desired value ($S_{60} \ldots S_{79}$). The remaining twenty are assigned to the excess weight region ($S_{80} \ldots S_{99}$). The number of display elements assigned to individual storage values S determines the slope of the various branches of the curve in FIG. 2, i.e. branches 26, 28, and 30, as well as the percentage of the desired weight at which the transitions are to take place. It is obvious that a large number of different slopes can be created and the total number of display elements can readily be adapted to any particular purpose. The boundary conditions required for individual cases will readily suggest the appropriate concrete values.

Depending upon the overall storage room available, part 18($a$) of ROM 18 may contain a plurality of tables $S_m$. For example, one may have a transition phase extending from 80% to 98% of the desired value, while another has a transition phase extending from 90% to 99%. The desired transition phase can then be selected by a choice of the corresponding table which, in turn, is accomplished by activation of a key in keyboard 34. The display can therefore be adjusted to have characteristics which are particularly suitable to the material being measured or to the skill of the operator.

Analog display 24 can be constructed in a number of conventional ways, using either active or passive types of indicators. For example:

A fluorescent display having element means, such as 100 individual display elements 36 may be used. The contour of the container will glow as soon as the instrument has been energized and may be constructed of fluorescent segments, as are the indicator elements 36. A point raster can also be used. The calibration or scale markings, as well as symbols S and N can also be fluorescent elements, or, alternatively, may be permanent marks on the display window.

A liquid crystal display with corresponding vapor deposited elements, such as electrodes may be used. Finally, a cathode ray tube is of course applicable.

The last named possibility results in a particularly flexible although somewhat more expensive instrument. A numeric display can of course also appear on the screen on the cathode ray tube and the desired value may also be displayed while the metering process is in progress. In addition, the weight range during the fine metering phase may again be expanded in an additional or alternative representation in order to allow particularly precise dosing. It is also possible to allow the contour of the container to change under operator control or in accordance with a program providing contour control signals, so that, for example, a change in container shape accompanies changes in the percentage of the desired weight at which the transition from coarse to fine metering takes place.

The particular balance or measuring cell used is irrelevant. It is only necessary that a weight signal in digital form be provided.

Other variations of the basic principle are possible. For example, an acoustic signal may be used to warn the operator that the transition phase is starting. In special cases a provision may be made for three metering phases, with two or even without any transition phases. It is also possible that the linear coarse metering range (26) is followed only by the non-linear transition range, i.e. eliminating the second linear range of neck 30. Finally the basic principle would not even exclude a curve according to FIG. 2 in which the non-linear relationshp holds throughout the whole metering cycle, the slope of the curve being smaller at the start than near the desired value.

If the metering process requires a mixing of a plurality of components, a tare operation is carried out at the end of the metering of each component. Numerical display 22 will then indicate zero and the container in analog display 24 will again be empty. Next, the desired value for the subsequent component is keyed in and the metering process for that component follows as described above.

For the sake of completeness, it should also be noted that "metering" includes removing a substance from the instrment as well as adding it thereto. To accommodate such cases, a second container may be included in the display the second container being upside down. The container will be full at the start of the metering process and, as the substance is removed from the instrument, would become more and more "empty". Alternatively, the display could be in the shape of an hour glass of which the bottom portion "fills" while material is being added to the balance, the top portion emptying in a direction from the top towards the bottom as material is being removed.

While the invention has been illustrated in preferred embodiments, it is not to be limited to the circuits and structures shown, since many variations thereof will be evident to one skilled in the art and are intended to be encompassed in the present invention as set forth in the following claims.

I claim:

1. Method for guiding an operator metering a substance from a starting value to a desired value on a measuring instrument having a display unit, comprising the steps of
   creating from display element means a clearly defined outline of a container on said display unit;
   creating weight signals indicative of the then-present weight of said substance on said measuring instrument;
   creating weight indicating control signals in response to said weight signals;
   said weight indicating control signals displaying any change in the contents of said container on said display unit from said starting value to said desired value at a first image rate of change relative to the rate of change of said substance on said measuring instrument at the start of said metering, and at a second image rate of change relative to the rate of change of said substance before said desired value is reached.

2. A method as set forth in claim 1, wherein said metering has a first and second phase; and
   wherein said first image rate of change occurs during said first phase and said second image rate of change occurs during said second phase.

3. A method as set forth in claim 2, further comprising a third phase between said first and second phases; and
   wherein said first image rate of change gradually changes to said second image rate of change during said third phase.

4. A method as set forth in claim 1, wherein said container has calibration marks in the region of said desired value.

5. A method as set forth in claim 1, wherein the outline of said container is bottle-shaped.

6. A method as set forth in claim 1, further comprising the step of varying said image rate of change corresponding to the shape of said container.

7. A method as set forth in claim 1, wherein said display element means include contour control signals for allowing an operator to change the countour of the container under operator control in accordance with a program, whereby any change in the contour of the container accompanies a corresponding change in the contents of said container from said first level to said second level.

8. Method as set forth in claim 1, wherein the step of creating a clearly defined outline of the container includes the step of creating an at least substantially uniformly defined outline.

9. Apparatus for guiding an operator metering a substance from a starting to a desired value on a measuring instrument having a display unit, comprising in combination,
   first means for generating weight signals indicative of the then-present weight of said substance on said measuring instrument;
   second means interconnected between said first means and said display unit for generating weight indicating control signals in response to said weight signals, and
   third means including display element means for creating at least a clearly defined outline of a container on said display unit from said element means;

said weight-indicating control signals displaying any change in the contents of said container from a first to a second level, corresponding, respectively, to said starting and desired values, starting at a first image rate of change relative to the rate of application of said substance to said measuring instrument, and changing to a second image rate of change relative to said application rate before reaching said desired value.

10. Apparatus as set forth in claim 9, wherein said display unit comprises a screen.

11. Apparatus as set forth in claim 9, wherein said display unit comprises a plurality of fixed, selectively controllable display elements responsive to said weight-indicating control signals.

12. Apparatus as set forth in claim 9, further comprising a selector element for selecting the value at which said first image rate of change is changed to said second image rate of change.

13. Apparatus as set forth in claim 9, wherein said image of said container has calibration marks near said desired value.

14. Apparatus as set forth in Claim 13, further comprising alpha-numeric designations in vicinity of said image of said container to indicate the value of each of said calibration marks.

15. Apparatus as set forth in claim 9, wherein said display unit includes a fluorescent display.

16. Apparatus as set forth in claim 9, wherein said display unit includes a liquid crystal display.

17. Apparatus as set forth in claim 9, wherein said element means for creating at least a clearly defined outline of the container include element means for creating at least a uniformly defined outline of the container.

18. Apparatus as set forth in claim 9, wherein said display element means include contour control signals for allowing an operator to change the countour of the container under operator control in accordance with a program, whereby any change in the contour of the container accompanies a corresponding change in the contents of said container from said first level to said second level.

19. Apparatus as set forth in claim 9, wherein the shape of the outline of said container changes at the levels corresponding to the change in said image rate of change.

20. Apparatus as set forth in claim 9, wherein said second means comprises a microcomputer.

* * * * *